United States Patent [19]

Van Veldhuizen

[11] Patent Number: 4,750,176
[45] Date of Patent: Jun. 7, 1988

[54] SINGLE-CHANNEL COMMUNICATION BUS SYSTEM AND STATION FOR USE IN SUCH SYSTEM

[75] Inventor: Evert D. Van Veldhuizen, Eindhoven, Netherlands

[73] Assignee: U.S. Philips Corporation, New York, N.Y.

[21] Appl. No.: 880,417

[22] Filed: Jun. 30, 1986

[51] Int. Cl.[4] .................. G08C 25/02; G06F 11/10
[52] U.S. Cl. .......................................... 371/32; 370/85
[58] Field of Search ............... 371/32, 33, 35; 375/99, 375/10; 370/13, 94, 85

[56] References Cited

U.S. PATENT DOCUMENTS

| | | | |
|---|---|---|---|
| 4,144,522 | 3/1979 | Kageyama | 371/32 |
| 4,393,501 | 7/1983 | Kellogg | 371/33 |
| 4,422,171 | 12/1983 | Wortley | 371/32 |
| 4,429,384 | 1/1984 | Kaplinsky | 370/85 |

Primary Examiner—Charles E. Atkinson
Assistant Examiner—Robert W. Beausoliel
Attorney, Agent, or Firm—James J. Cannon

[57] ABSTRACT

The invention relates to a single-channel digital communication bus system and to a station for use in such system. Only a single physical interconnection between the stations is present for transferring the data. Bit synchronization is effected either in that the data is self-clocking or by a second, clock lead. The data channel realizes an AND-function. The transmission of a message by a master station is answered by an addressed slave by an acknowledge signal train. The acknowledge signal train has a plurality of bits, inclusive of error protection bits. Error protection may be effected by transmitting a series of mutually identical bits, or by means of a CRC signal subtrain. The acknowledge may be positive, negative or a "no acknowledge" signal train.

17 Claims, 2 Drawing Sheets

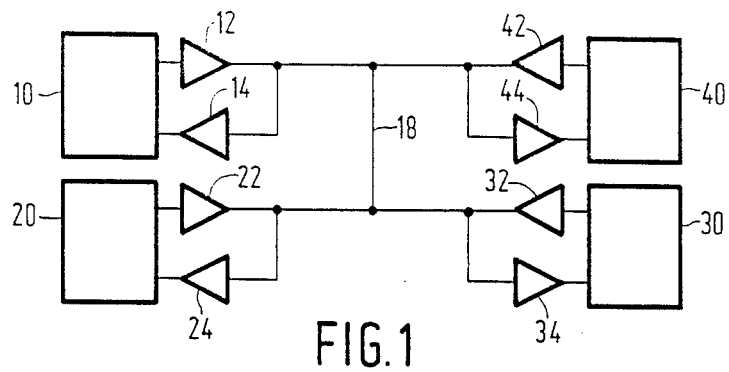
FIG.1
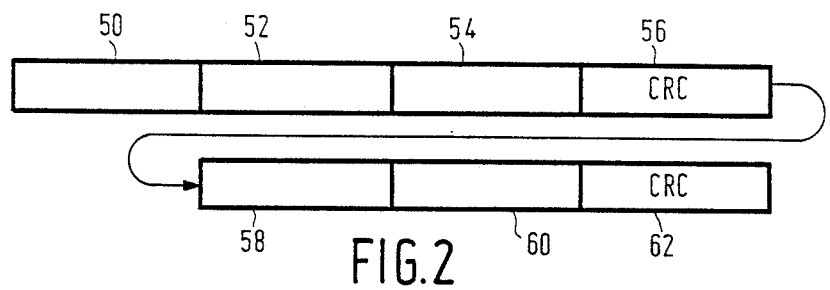
FIG.2
```
NEG  ACK    1 1 1 0 0 0 0 0
POS  ACK    0 0 0 1 1 1 1 1
NO   ACK    1 1 1 1 1 1 1 1
```
FIG.3
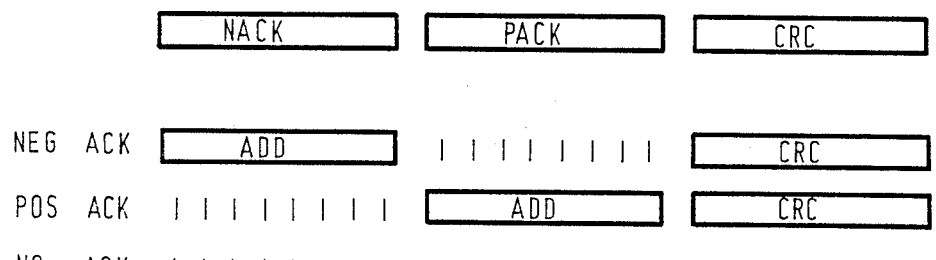
FIG.4

SINGLE-CHANNEL COMMUNICATION BUS SYSTEM AND STATION FOR USE IN SUCH SYSTEM

BACKGROUND TO THE INVENTION

The invention relates to a single-channel communication bus system. Such a system is understood to mean one which has the data travelling serially along one physical connection. The data may be self-clocking. In such case either one lead is present, or alternatively two wires carrying, for example, symmetric signals. The data may, alternatively, be not self-clocking. In that case a further lead is present for transferring synchronizing clock signals. Various bus systems have been described in the art; an exemplary state is given by U.S. Pat. No. 4,429,384 or U.S. patent application Ser. No. 317,693, both to the same assignee as this application and herein incorporated by reference. According to the first reference, the data itself is self-clocking, the bus interconnection has a logic-AND-function (wired-AND), each bit cell has two transitions, the position of the second thereof representing the data content of the bit in question. The first transition is always near the start of the bit cell. Provisions have been made for an arbitraging organization: if two stations send simultaneously different bit values to the bus, the logic-AND-function will see to it that all stations receive a logic "zero". Thus the logic "one" is masked and the station sending the "one" has lost the arbitrage and is thus forced to relinquish control of the bus.

Transferring of a message in the above described communication system and various other systems necessitates to answer a message with an acknowledge. Such acknowledgement is then usually sent by one (or more) stations acting as slaves. Such slave could function either as a slave receiver or as a slave transmitter (the latter for example if an addressed memory operates in a reading access).

SUMMARY OF THE INVENTION

It is an object of the invention to realize an effective and safe acknowledgement signalization in such type of system, wherein an appreciable protection is provided against misrecognized acknowledge bits, and wherein in an extended realization provision is also made for transferring an address by the slave station.

The object of the invention is realized in that the invention provides a single-channel digital communication bus system having a master station and at least one slave station interconnected by said bus, said master station having first transmitting means for transmitting a message comprising at least an address signal train followed by a data signal train and an error protection signal train, said bus constituting a logic-AND-function, said slave station comprising second transmitting means for upon receiving such address cum data cum error protection signals train in said slave station transmitting a multibit acknowledge signal train inclusive of second error protection signals, and wherein all of said signal trains are synchronizing by means of at least one signal transition at a predetermined point within each bit cell. The multiplicity of bits within an acknowledge signal train allows for various protection levels therein. Specifically both positive and negative acknowledge signals are possible. If neither of these apply, a "no acknowledge" signal would be a third possibility. Such "no acknowledge" would never mask a positive acknowledge, nor a negative acknowledge. A prime result of the present invention is that it would be quite improbable to overlook a "negative acknowledge". Such signal would mean that an addressed slave station recognizes an incorrect situation, for example by interference or mutilated signals received. The invention also relates to master stations and slave stations for use in the described communication system. Such stations could either be designed for steady connection to the system, or for temporary connection, for example by insertable plug.

BRIEF DESCRIPTION OF THE DRAWINGS

The invention will be further explained with reference to the accompanying drawings that show an exemplary, preferred embodiment of the invention.

FIG. 1 is a block diagram of a single wire communication system;

FIG. 2 is a sequence diagram of a message transfer cum acknowledge signalization;

FIG. 3 shows a first acknowledge signalization format;

FIG. 4 shows a second acknowledge signalization format;

THE COMMUNICATION SYSTEM

Figure 5:
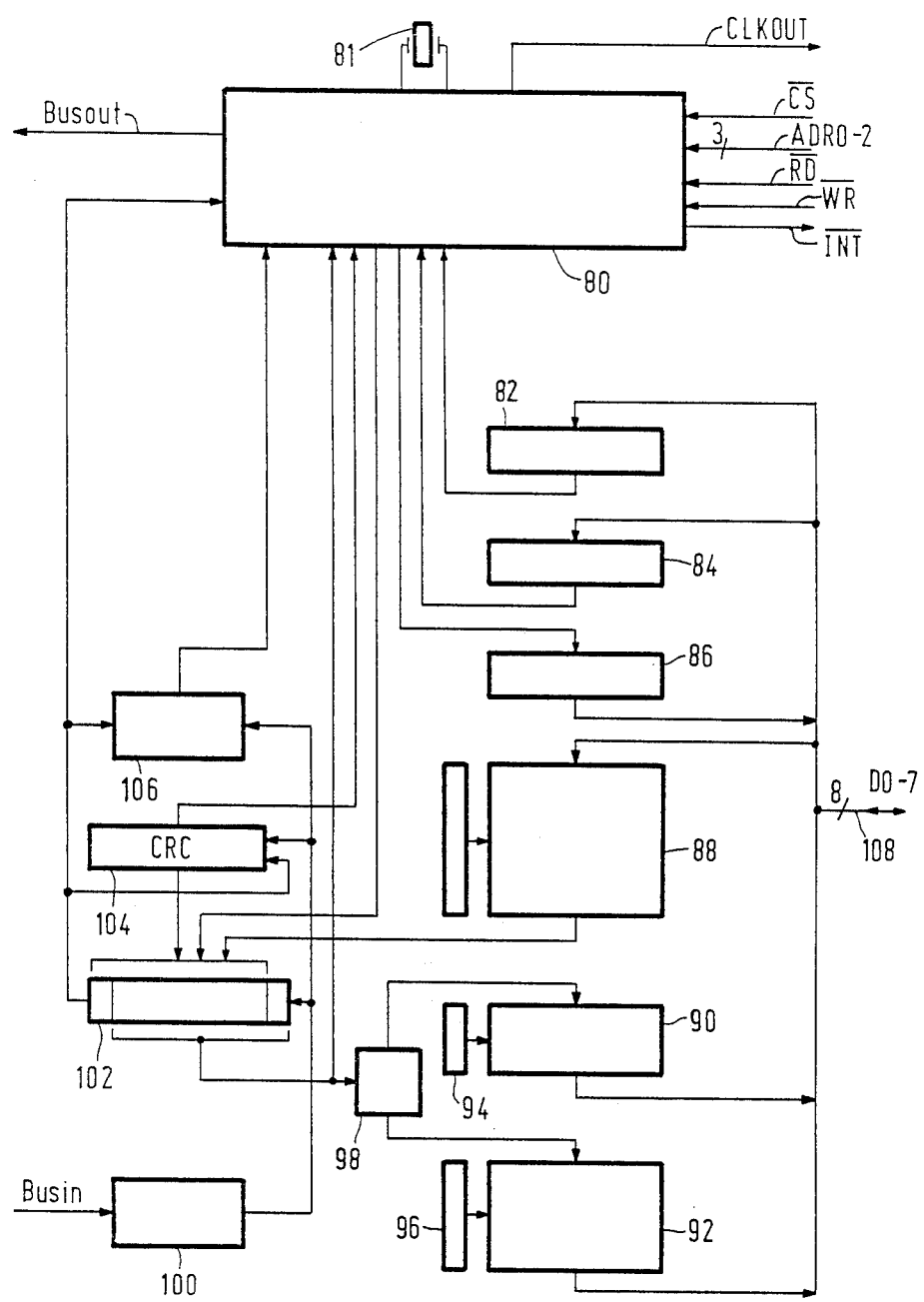
FIG. 5 is an exemplary block diagram of a bus controller circuit.

FIG. 1 is a block diagram of an exemplary single wire communication system. Four stations 10, 20, 30, 40 are present, each provided with an output driver 12, 22, 23, 42 and a sense amplifier 14, 24, 34, 44. All drivers and amplifiers are connected to common single wire interconnection 18, the latter representing a wired-AND-function. Such wired-AND-function may conventionally be realized by means of the various drivers having open collector outputs. Other realizations, such as three-state-output drivers are also well-known in the art. The stations may comprise microprocessor functions, memory functions, sensor functions, drive functions, display functions, and other. The field of use may be home entertainment (each station representing a home entertainment function, such as a tape or "compact disc" deck, a radio tuner, a telephone set etcetera). Another field of use is automotive electronics, the various stations representing central control, engine ignition control, dashboard control and display functions, overall access and safety control, and the like. Certain stations may operate as master, others as slave, others again as either master or slave. Certain stations may operate as transmitter, others as receiver, others again as both. Thus many different categories could exist in any system.

DESCRIPTION OF A MESSAGE PROTOCOL

FIG. 2 gives a sequence diagram of a message transfer cum acknowledge signalization. Message blocks 50 through 56 are generated by a master station. Block 50 represents a message header. This may include synchronization on a message level (higher than bit level), start pattern, possibly a priority number if arbitraging is necessary. If a plurality of prospective master stations coincidentally start with sending such message header, at the end of block 50 a single master station is left over to grab control of the bus. In block 52 an intended slave address is transmitted. In certain configurations, specific addresses could access two or more, or even all slaves. In block 54 slave intended data is transferred. This can relate to a function to be executed by a slave, data be written into a slave station, etcetera. In block 56 a CRC-bit block is transferred, for signalling whether the transfer had been correct. In such way a very effective security verification is executable. In an elementary system, each of these four blocks contains eight bits. This number of blocks could be higher, otherwise, one or more blocks could be omitted, for example in certain applications no data are necessary, for example if a general read command is transferred.

The above master produced message is answered by the slave station so addressed by means of answer consisting of blocks 58. 60. 62. Block 58 is an acknowledge block, signalling the quality of an answer if feasible. The answer proper is represented by block 60. A final block 62 represents a CRC-check. Again, all blocks 58, 60, 62 have eight bits. In certain situations block 60, 62 or both may be left out. Only an acknowledge block is necessary to signal an answer from the slave station in question. It should be noted that a plurality of slave stations may signal various responses to the master station in mutual synchronism.

DESCRIPTION OF ACKNOWLEDGE FORMATS

FIG. 3 shows a first acknowledge synchronization format. The acknowledge field is split into two parts:
Positive acknowledge (3 bits). During these bits the slave unit(s) send "0"s (bus "low") in case they have been addressed and have received the message correctly.
Negative acknowledge (5 bits). During these bits the slave unit(s) send "0"s (bus "low") in case they have detected a CRC-error.

A slave unit may send one of three different acknowledge bytes:
positive acknowledge. The acknowledge byte sent is "00011111" in case the unit has been addressed (physically or by function) and no error has been found.
negative acknowledge. The acknowledge byte sent is "11100000" in case the unit has detected a CRC-error.
no acknowledge. The acknowledge byte sent is "11111111" in case the unit is not involved in this message (has not been addressed and has not detected a CRC-error).

The bit configuration in the acknowledge byte is such that even if a number of bits are corrupted, the master is able to detect whether a retransmission is necessary.

If a slave is not able to react in time a "no acknowledge" will be sent by default.

If any one of the five last acknowledge bits received by the master is a "zero", the master station is bound to suppose that a negative acknowledge was intended by the slave station. This is an extremely safe scheme, in which it would be very improbable that a negative acknowledge would be by chance considered as positive acknowledge or "no acknowledge". Of course, other schemes could be valuable, for example a majority detection among the last five bits. This would allow for mistransmission of only two of these five bits; thus this is somewhat less safe. The positive acknowledge could also be detected in various ways, for example by a majority detection among the first three bits, under condition that no negative acknowledge is being recognized. Note that the negative acknowledge always has preponderance. If neither positive nor negative acknowledge is detected, a "no acknowledge" is assumed. If a negative acknowledge and a "no acknowledge" coincide, the former wins. If a positive acknowledge and a "no acknowledge" coincide, also the former wins. If all three coincide, the negative acknowledge wins. A unit may respond by means of a negative acknowledge for a maximum of 3 consecutive messages. If an error is still detected in the 4th message a "no acknowledge" must be sent.

FIG. 4 shows a second acknowledge signalization format. This further format allows the slave station(s) for coincidingly with acknowledging to send one eight bit data answer. The three lines, again show a negative acknowledge, a positive acknowledge, and a "no acknowledge". In the first, by way of example, the slave address is transferred as a unique bit configuration. Thereafter, an "all-one" byte is sent, and finally a correct CRC-check byte to detect any possible interference. In the positive acknowledge, the functions of the first two bytes are interchanged. The addresses thus sent by a slave may be effectively used to ascertain which slaves give erroneous reactions. For example, if a certain slave station persistently signals negative acknowledge, while other slaves do not, the particular slave may be malfunctioning. If the CRC does not fit consistently, such malfunction is all the more probable. The "no acknowledge" signal consists of three bytes of all "ones". This is furthermore detected, in that the CRC is not a correct function. CRC is generated by known generating polynomials and so the deviation is easily detected. The above scheme only works properly if the slave address "11111111" (hex FF) is not permitted if mixed positive and negative acknowledge signals are received always the "zeroes" thereof are dominant and an arbitrage between the "address" of the negatively acknowledging slave station has preponderance over the all-one byte of any other slave with a positive acknowledge. If mixed "no acknowledge" and positive/negative acknowledge signals are mixed, the "no acknowledge" sending stations always lose the competition and relinquish the bus. The format of FIG. 4 has the disadvantage of being of lesser bus economy. However ,the system flexibility is improved.

DISCLOSURE OF AN EXEMPLARY STATION APPARATUS

FIG. 5 is an exemplary block diagram of a bus controller circuit. The functioning of the station proper is outside the scope of the present invention and will not be considered for brevity. The bus controller is a single integrated circuit. Bus in and bus out are interconnected to the bus proper according to FIG. 1. The following subsystems are provided .
Timing and control (80) with oscillator (81) crystal. The functions performed by this part are:
oscillator and clock output (for microcontroller)
generate bit clock (by means of clock divide)
produce "bus out" signal
determine sample moment and shift data for 102
control read and write of registers
generate interrupts
produce acknowledge
The addressing of registers is as follows:
000: clock divide
001: command
010: write buffer
011: spare
100: interrupts 101: read buffer A
110: read buffer B
111: spare Clock divide (82)

This register is loaded by the microcontroller (CPU) input 108. Its contents determine the division factor (n) of the oscillator frequency (F) to come to the frequency of the bit clock. The number of bit clock pulses for each bit is 64. The bit rate will then be: $F/(n*64)$ bits/sec.

Command (84)

This register contains the following bits:
Bit 7: master request
Bit 6: spare
Bit 5: spare
Bit 4: reset master section
Bit 3: release read buffer A
Bit 2: release read buffer B
Bit 1: acknowledge
Bit 0: reset slave section.

The meaning of the individual bits is as follows:

Master request

This bit must be set by the microcontroller (CPU) when it has loaded the write buffer with a complete message. The bus controller will then start to send this message. When arbitration is lost the bus controller will automatically try to send the message again without intervention of the CPU being necessary. This bit will be reset when the complete message has been sent on the bus and the acknowledge byte has been received. It will also be reset when the command "reset master section" has been given, provided that no message sending is in progress.

Reset master section

When this command is given by the CPU and no message sending is in progress, the master section is initialized (reset master request, reset write buffer pointer). If the command is given when a master transfer is in progress no action will be taken. The "reset master section" bit is reset when initialization has taken place or when a master transfer is in progress.

Release read buffer A

When buffer A has been read the CPU should release the buffer by setting this bit. The bit "release read buffer A" will be reset as soon as the bus controller starts loading the buffer again.

Release read buffer B

When buffer B has been read the CPU should release the buffer by setting this bit. If the bit has not been set before new data has to be loaded into the buffer an interrupt with bit 0 (data overrun) set will be given (see section 4.4: interrupts). If the CPU is not involved in the current message the command "release buffer B" may be given before this buffer has been loaded completely so that no interrupt "read buffer B full" will be given. The bit "release read buffer B" will be reset as soon as the bus controller starts loading the buffer again.

Acknowledge

This bit must be set by the CPU when it has recognized the address or function field in the message. When it has been set the bus controller slave section will generate a positive acknowledge when a correct message has been received. It will generate a negative acknowledge when an error has been detected or when data overrun has occurred. When this bit has not been set no acknowledge will be generated. This means that all "1"s will be sent in the acknowledge field. The bit "acknowledge" will be reset as soon as the acknowledge byte has been sent or when the bus is in the idle state.

Reset slave section

When this command is given by the CPU and no message is being received, the slave section is initialized (reset read buffer pointers, set buffer switch to A). If the command is given when a slave transfer is in progress no action will be taken. The "reset slave section" bit is reset when initialization has taken place or when a slave transfer is in progress.

Interrupts (86)

The bits of this register are set by the timing and control part. When one or more bits are "1" the interrupt signal will be active (INTnot="0").
Bit 7: master transfer ready
Bit 6: master transfer busy
Bit 5: master transfer bus error
Bit 4: spare
Bit 3: read buffer A full
Bit 2: read buffer B full
Bit 1: bus read error
Bit 0: data overrun.

All bits are reset when the interrupt register has been read. The meaning of the individual bits is:

Master transfer ready

This interrupt is given when a message has been sent and the acknowledge byte has been received so that bit 5: "master transfer bus error" may also be tested.

Master transfer busy

This interrupt is given when an attempt is made by the CPU to load the write buffer when command register bit 7: "master request" is still set (master transfer in progress).

Master transfer error

This bit will only be set in conjunction with bit 7: "master transfer ready". When set a negative acknowledge or no acknowledge has been received.

Read buffer A full

This interrupt is given when buffer A has been loaded with the first two received bytes of a message and read buffer B has been released or overrun of read buffer B has occurred.

Read buffer B full

This interrupt is given when buffer B has been loaded with the rest of the complete message and the CRC has been checked so that bit 1: "bus read error" may also be tested. The actual number of bytes in the buffer is determined by the length field in the message. (Max 17).

Bus read error

This bit will only be set in conjunction with bit 2: "read buffer B full". When set a CRC-error has been detected.

Data overrun

This bit will only be set in conjunction with bit 3: "read buffer A full". When set read buffer B has not been released before a new data byte had to be written into this buffer.

When a buffer has not been released before new data has to be written into that buffer the new data will not be written and the new message will be lost. When an overrun of read buffer A occurs (both read buffers full and a new byte has to be written in buffer A) no indication will be given and "no acknowledge" will be sent for this message.

Write buffer (88)

This is a 19 byte RAM that is addressed by means of a pointer. A complete message is loaded into this RAM by the microcontroller. The bytes are written sequentially, whereby the pointer is incremented after each byte. The pointer is reset when the last byte has been written (indicated by Command register bit 7: "master request") or when the last byte has been sent (indicated by interrupt register bit 7: "master transfer ready") or when the master section is reset. It is not possible to store bytes into the write buffer when a master transfer is in progress.

Read buffer A (90)

This is a 2 byte RAM in which the first two bytes of an incoming message are stored. It is addressed by a pointer. When the second byte (address or function) has been stored and read buffer B has been released or the third byte of the message has been received an interrupt with interrupt register bit 3 (read buffer A full) set is given and the pointer is reset. The pointer is also reset when the command "release read buffer A" is given by the CPU.

Read buffer B (92)

This is a 17 byte RAM in which the remaining bytes of a message are stored. It is addressed by a pointer. When the last byte has been stored and the CRC has been checked an interrupt with interrupt register bit 2 (read buffer B full) set is given and the pointer is reset. The pointer is also reset when the command "release read buffer B" is given by the CPU.

Buffer switch (98)

The position of this switch depends on the byte number in the message that has to be stored. The first two bytes of the message are always loaded into read buffer A. The rest of the message is loaded into read buffer B.

Arbitration (106)

This is a comparator between the bit that is sent on the bus and the actual bus data as read (after the digital filter). Timing for this comparison is provided by the timing and control part. When the result of this comparison is unequal arbitration is lost and the pointer of the write buffer will be reset. The bus controller will try again to send the message. When a message is being sent the slave section will read the incoming information and generate interrupts if necessary. This is done to retain the information in case the arbitration is lost and the unit has to act as a slave.

CRC (104)

The CRC generator/checker is a shift register with exclusive OR gates to provide a polynominal $X^{}8+X^{}2+X+1$. The initial contents is set to all "1". This is done when the bus is idle. When information is sent on the bus the input for the CRC is taken from the output of the shift register. When information is read from the bus the input is taken from the output of the digital filter. When a master transfer is taking place and the last data byte has been sent the contents of the CRC register is loaded into the shift register and will be sent on the bus. When the unit is reading information the timing and control part will check the CRC register for all "0"s after the CRC byte has been read. If the CRC register contains all "0"s a positive acknowledge will be given when bit 1 (acknowledge) in the command register is set. Otherwise no acknowledge will be given. (See sections 3.2.10: acknowledge). If the CRC register does not contain all "0"s an error has occurred. In that case a negative acknowledge will be given when bit 1 (acknowledge) in the command register is set. Otherwise no acknowledge will be given. When an error has occurred and bit 1 in the command register was set, bit 1 (bus read error) in the interrupt register will be set together with bit 2 (read buffer B full).

Shift register (102)

This register contains the data that is sent on the bus as well as the data that is received. The register consists of 9 flipflops. The least significant one is clocked at the sampling moment to store the incoming bit. The shift clock occurs at the leading edge of T1 of each bit cell. The 8 most significant bits are loaded from 3 possible sources: write buffer. To send the required data on the bus. CRC register. To send the CRC code as generated while sending data. acknowledge. The acknowledge byte is determined by the timing and control part.

The information in the 8 least significant bits of the shift register is sent to read buffer A or B except for CRC and acknowledge bytes that are sent to the timing and control part to be checked.

Digital filter (100)

This is a logic circuit that prevents narrow pulses from the receiver to be taken into account. A pulse must be at least two bit clock times wide before it is recognized. In this way spurious pulses caused by noise on the bus may be filtered out. The circuit consists of 3 flipflops and some conditioning logic. The propagation delay through the filter is 3 bit clock times.

Remark: If the bus interface circuit contains an analog low pass filter it may not be necessary to implement a digital filter.

What is claimed is:

1. A single-channel digital communication bus system having a master station and at lease one slave station interconnected for communication by said bus, said bus constituting a logic-AND-function said master station having first transmitting means for transmitting a message on said bus comprising at least an address signal train followed by a data signal train and an error protection signal train, said slave station comprising second transmitting means for receiving such address cum data cum error protection signals train as slave station and transmitting on said bus a multiple acknowledge signal train inclusive of second error protection signals allowing for correction of at least one bit, and wherein all of said signal trains are synchronized by means of at least one signal transition at a predetermined point within each bit cell.

2. A single-channel digital communication bus system as claimed in claim 1, wherein said acknowledge cum second error protection signal train constitutes a single signal train having a first plurality of bit positions for representing a positive acknowledge signal and, a second plurality of bit positions for representing a negative acknowledge signal.

3. A single-channel digital communication bus system as claimed in claim 2, wherein said first and second plurality of bit positions are mutually exclusive and said second plurality is larger than said first plurality.

4. A slave station for use in a single-channel digital communication system as claimed in claim 3, comprising transmitting means for transmitting an acknowledge byte having a first number of bit positions for by means of zeroes therein signalling a positive acknowledge and a second number of bit positions for by means of zeroes therein signalling a negative acknowledge.

5. A slave station as claimed in claim 4, wherein said transmitting means have a state for signalling a "no acknowledge" signal by means of exclusively transmitting "ones" within said train.

6. A slave station as claimed in claim 5, having counting means for upon being addressed counting the number of times of consecutively transmitting a negative acknowledge and upon reaching a predetermined count thereafter transmitting a "no acknowledge" signal.

7. A slave station for use in a single-channel digital communication system as claimed in claim 2, comprising transmitting means for transmitting an acknowledge byte having a first number of bit positions for by means of zeroes therein signalling a positive acknowledge and a second number of bit positions for by means of zeroes therein signalling a negative acknowledge.

8. A slave station as claimed in claim 7, wherein said transmitting means have a state for signalling a "no acknowledge" signal by means of exclusively transmitting "ones" within said train.

9. A slave station as claimed in claim 8, having counting means for upon being addressed counting the number of times of consecutively transmitting a negative acknowledge and upon reaching a predetermined count thereafter transmitting a "no acknowledge" signal.

10. A master station for use with a slave station as claimed in claim 7, 8, 9, 4, 5 or 6, having receiving means for upon reception of a predetermined minimum number of zeroes within said second number of bit poisitions recognizing a negative acknowledge signal in spite of an arbitrary content of any remaining bit position within said acknowledge byte.

11. A single-channel digital communication system as claimed in claim 1, wherein said acknowledge cum second error protection signal train comprises a sequence of signal subtrains, a first subtrain of exclusively "one" bits in combination with a second subtrain of not-all-ones constituting a slave station data signalling a positive acknowledge, a second subtrain of exclusively "one" bits in combination with a first subtrain of not-all-ones constituting a slave station data signalling a negative acknowledge; both a negative acknowledge and a positive acknowledge being completed by a third subtrain comprising an error detection bit sequence.

12. A single-channel digital communication system as claimed in claim 11, wherein said slave station data represent a particular slave station address.

13. A single-channel digital communication bus system as claimed in claim 11 or 12, wherein error detection bit sequence is a CRC bit sequence as calculated over either a negative or a positive acknowledgement signal.

14. A slave station for use in a single-channel digital communication bus system as claimed in claim 11, furthermore comprising conflict detecting means for during said first and second subtrains detecting a zero bus bit as representing a discrepancy with respect to its own transmitted bit in the bit position in question, said conflict detecting means thereupon causing termination of transmitting the acknowledge signal train by the station in question.

15. A slave station for use in a single-channel digital communication bus system as claimed in claim 11, wherein said transmitting means has a state for transmitting a "no acknowledge" signal by means of exclusively transmitting "ones" within said train.

16. A master station for use with a slave station as claimed in claim 15 having means for upon receiving non-conforming error protection subtrain repeating its own message.

17. A master station as claimed in claim 16, furthermore having a detector for upon reception of two subtrains comprising only "one" bits detecting a "no acknowledge" signal on the basis of a non-conforming error detection subtrain.

* * * * *